United States Patent
Jager et al.

(10) Patent No.: US 8,560,691 B2
(45) Date of Patent: Oct. 15, 2013

(54) RELOCATING ITEM IN DISTRIBUTED STORAGE SYSTEM

(75) Inventors: Marcus J. Jager, Boulder Creek, CA (US); John P. MacCormick, San Francisco, CA (US); Douglas J. McCulloch, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 670 days.

(21) Appl. No.: 11/820,285

(22) Filed: Jun. 19, 2007

(65) Prior Publication Data

US 2008/0320005 A1 Dec. 25, 2008

(51) Int. Cl.
G06F 15/173 (2006.01)
G06F 15/16 (2006.01)

(52) U.S. Cl.
USPC ............ 709/226; 709/201; 709/212; 709/219

(58) Field of Classification Search
USPC ................. 709/201–203, 212–213, 217–219, 709/223–226
See application file for complete search history.

(56) References Cited

U.S. PATENT DOCUMENTS

| | | | |
|---|---|---|---|
| 5,668,943 A | 9/1997 | Attanasio et al. | |
| 5,790,848 A * | 8/1998 | Wlaschin | 707/661 |
| 5,850,522 A * | 12/1998 | Wlaschin | 709/215 |
| 6,070,191 A | 5/2000 | Narendran et al. | |
| 6,182,121 B1 * | 1/2001 | Wlaschin | 709/215 |
| 6,360,306 B1 | 3/2002 | Bergsten | |
| 6,694,447 B1 | 2/2004 | Leach et al. | |
| 6,801,949 B1 | 10/2004 | Bruck et al. | |
| 7,000,084 B2 | 2/2006 | Binzinger | |
| 7,069,468 B1 | 6/2006 | Olson et al. | |
| 7,140,044 B2 * | 11/2006 | Redlich et al. | 726/27 |
| 7,146,524 B2 | 12/2006 | Patel et al. | |
| 7,191,357 B2 * | 3/2007 | Holland et al. | 714/5 |
| 7,483,318 B2 * | 1/2009 | Ogihara et al. | 365/200 |
| 7,529,816 B2 * | 5/2009 | Hayden et al. | 709/220 |
| 7,720,796 B2 * | 5/2010 | Wong et al. | 707/639 |
| 8,220,064 B2 * | 7/2012 | Yamauchi et al. | 726/31 |
| 8,380,673 B2 * | 2/2013 | Anzai | 707/655 |
| 2002/0133491 A1 | 9/2002 | Sim et al. | |
| 2003/0018927 A1 | 1/2003 | Gadir et al. | |

OTHER PUBLICATIONS

Evans Matt, "FTFS: The Design of a Fault Tolerant Distributed File-System", Date: May 2000, pp. 1-49, http://www.cse.unl.edu/~goddard/Courses/CSCE855/EvansThesis.pdf.

(Continued)

Primary Examiner — Bharat N Barot

(57) ABSTRACT

Techniques are provided for moving an item from one item server to another item server in a distributed storage system, using a location service, APIs, and item states. There are three parties that transact with each other: a source item server, a destination item server, and a location service. Each item stored at the source has a move status, e.g., "stationary", "source attempting transfer", "destination accepting transfer", or "destination attempting transfer". Similarly, each item stored at the destination also has a move status, e.g., "stationary", "source attempting transfer", "destination accepting transfer", or "destination attempting transfer". The location service desirably has an entry for every item stored by the storage system. An item's entry may comprise the item's current location (e.g., an identifier of an item server) together with a state, such as "stable" or "attempting transfer".

19 Claims, 9 Drawing Sheets

(56) References Cited

OTHER PUBLICATIONS

G. Anick Peter, "Adapting a Full-text Information Retrieval System to the Computer Troubleshooting Domain", Proceedings of the 17th annual international ACM SIGIR conference on Research and development in information retrieval, Date: 1994, pp. 349-358, Springer-Verlag New York, Inc., New York, USA.

Leon, et al., "Fail-safe PVM: A portable package for distributed programming with transparent recovery", Date: Feb. 1993, http://www.dit.hcmut.edu.vn/~hungnq/courses/pp/thamkhao/Project/Checkpointing/MPI_PVM/PVM/Fail-safe%20PVM%20A%20portable%20package%20for%20distributed.pdf.

* cited by examiner

RELOCATING ITEM IN DISTRIBUTED STORAGE SYSTEM

BACKGROUND

A distributed storage system has multiple item servers, and stores items, such as files, emails, photos, or any other type of data. Each item is stored on one of the item servers. An item server could be a single computer, part of a computer (e.g., a partition on the computer's attached storage), several computers cooperating to replicate items, or some combination of these (e.g., a collection of three distinct partitions on three distinct computers might constitute a single item server).

It is sometimes necessary or desirable to move an item from one item server to another, to improve the system's performance or balance the item server storage load, for example. Conventional techniques are prone to failure, especially when a part of the system fails or reboots. For example, with conventional techniques, items are often lost or unintentionally duplicated.

SUMMARY

Techniques are provided for moving an item from one item server to another item server in a distributed storage system, using a location service, APIs, and item states. There are three parties that transact with each other: a source item server, a destination item server, and a location service. Each item stored at the source has a move status, e.g., "stationary", "source attempting transfer", "destination accepting transfer", or "destination attempting transfer". Similarly, each item stored at the destination also has a move status, e.g., "stationary", "source attempting transfer", "destination accepting transfer", or "destination attempting transfer". The location service desirably has an entry for every item stored by the storage system. An item's entry may comprise the item's current location (e.g., an identifier of an item server) together with a state, such as "stable" or "attempting transfer".

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION

Figure 1:
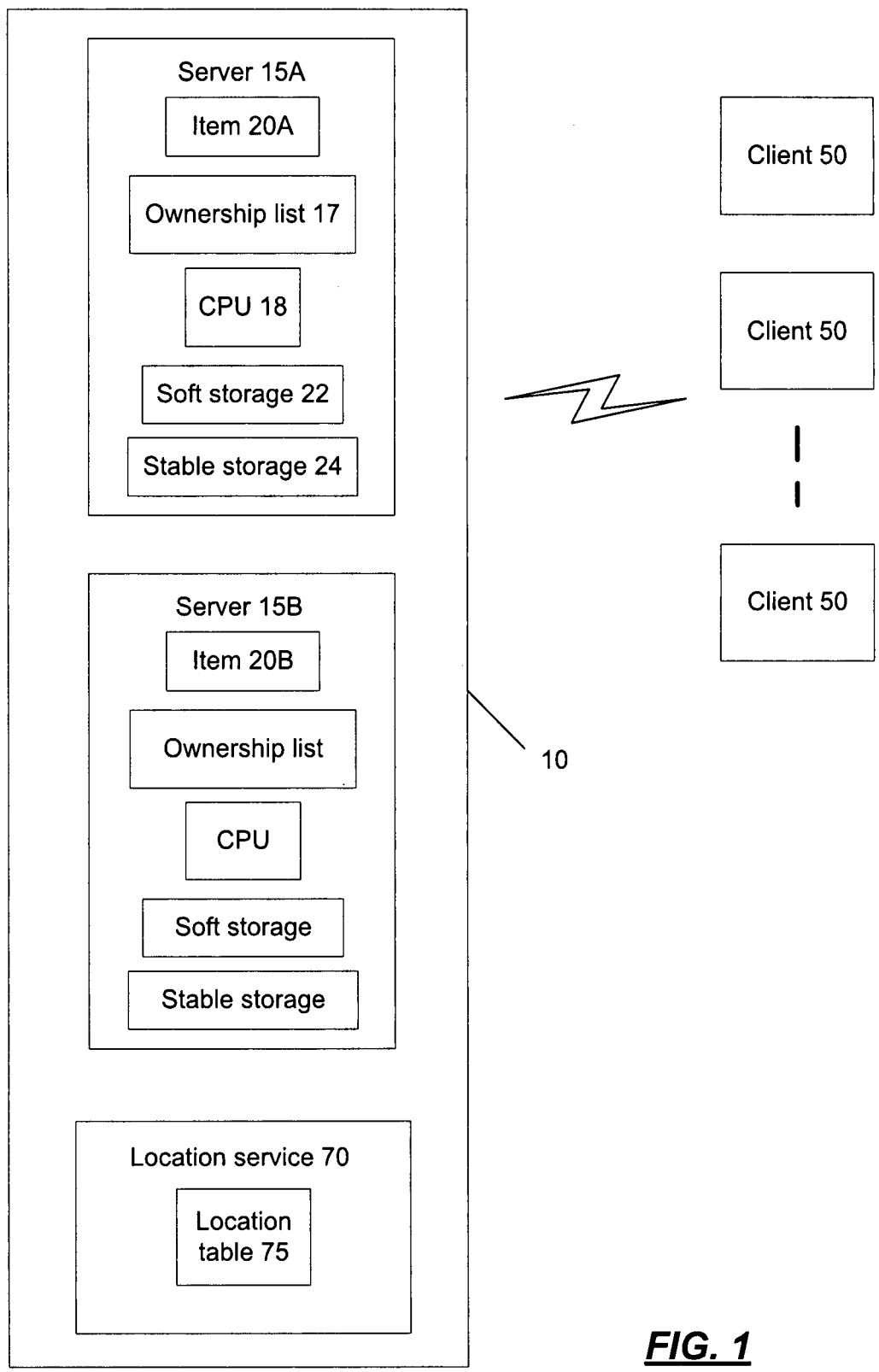
FIG. 1 is a block diagram of an example distributed storage system.

Techniques are provided for moving an item from one item server to another item server in a distributed storage system. A block diagram of an example distributed storage system is shown in FIG. 1, and follows a client/server model. In a typical setting, the system has a large number of server machines for storage of data items. As described further, there are three parties that transact with each other: a source, a destination, and a location service.

A storage system 10 contains multiple item servers 15A, 15B, etc. The item servers store items 20A, 20B, etc. Depending on the situation, an item server may function as a source item server or a destination item server, for example. An item could be any useful unit of storage, and is identified by a unique item identifier. For example, items could be files, and their identifiers could be filenames, or items could be fixed-size blocks, identified by block numbers. Each item is owned by exactly one item server, referred to as the item's location. Each item server may store many items. The storage system 10 offers users or clients 50 the ability to create, read, and update items.

Each item server 15A, 15B, etc. might be implemented by a set of physical machines and comprise, for example, a separate computer, a part of a computer (one partition of one disk array, for example), or two or more computers cooperating together to replicate and/or distribute items within the item server. Each item server 15A, 15B, etc. also comprises soft storage 22 (e.g., a computer memory) and stable storage 24 (e.g., a hard disk or non-volatile RAM). Thus, each server may have one or more CPUs, local memory, and locally attached disks, for example.

Each item server can fail at any time, but desirably does so in a fail-stop manner (i.e., it behaves correctly whenever it does anything, but it may stop performing any actions at all, and sometime after stopping it may reboot). Also, it is assumed that after a reboot, an item server has access to anything that was stored in its stable storage 24 before the reboot, but does not have access to anything in its soft storage 22 before the reboot.

There are also one or more clients 50 that take user or client requests and distribute read and update requests to the item servers 15A, 15B, etc. If an item server receives a request for an item it does not own, it desirably responds with an error; otherwise, it performs the request. These machines may be in the same administrative domain, connected through one or multiple high-speed network switches. The servers are often organized into racks with their own shared power supply and network switches.

The system may need or desire to change an item's location (e.g., for load balancing) by moving the item from one item server to another. Techniques are described herein for doing so correctly in the face of the fail-stop failures.

Each item server 15A, 15B, etc. desirably maintains a list 17 in stable storage 24 of all the items that it owns. This list 17 is referred to as the server's ownership list. For each item in its ownership list, an item server stably stores the item's move status. As an example, the move status may be "stationary", "source attempting transfer", "destination accepting transfer", or "destination attempting transfer". These states are described further herein. For each item in its ownership list, an item server also stably stores the item's data (e.g., the contents of the file or block represented by the item).

The storage system 10 also comprises a location service 70. A client 50 may use the location service 70 to determine where an item is located. For the examples herein, the location service 70 is assumed to be perfectly reliable. The location service 70 could be implemented as a replicated state machine running a consensus algorithm on many separate computers, or as a commercial database with built-in reliability guarantees, for example. The location service 70 desirably maintains a location table 75 that has an entry for every item 20A, 20B, etc. stored by the storage system 10. An item's entry may comprise the item's current location (e.g., an identifier of an item server) together with a state, such as one of the two states "stable" or "attempting transfer", described further herein.

The location service 70 permits item servers 15A, 15B, etc. to perform atomic compare-and-swap operations on any single entry in the location table 75. For example, an item server may execute the following command: "if item 'dog' is currently stored on server 57 and has state 'attempting transfer', then set its location table entry to server 91 with state 'stable'." This request may be written Change State (from: [57, attempting transfer]; to: [91, stable]).

Figure 2:
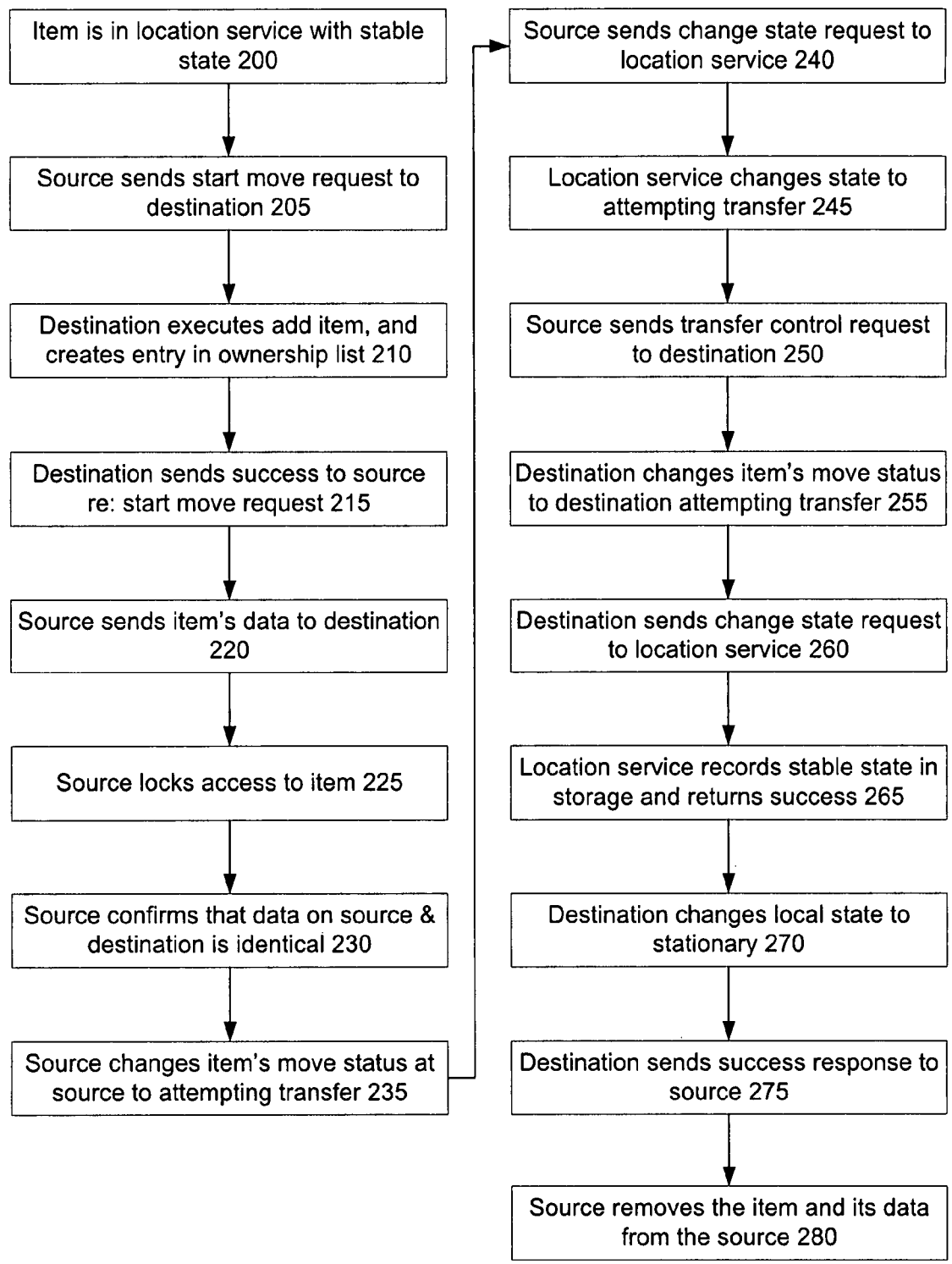
FIG. 2 is a flow diagram of an example method under normal operation.

An example method under normal operation is described with respect to FIG. 2, and is described as a sequence of operations that occurs under normal conditions (i.e., in the absence of failures, such as machines going down, messages being lost, software errors that cause machines to crash, hard disk errors, network errors, for example). This description refers to various API functions (e.g., Start Move) that are described in detail below. The APIs and their names are exemplary and other APIs and names may be used. The example technique seeks to move an item from a source item server to a destination item server, the identifiers of which are referred to as sourceID and destID, respectively.

At step 200, the location service starts with an item in a stable state, referred to as [sourceID, stable]. At the source, the item is in the ownership list with the state set to stationary. The item's data is stored on the source. The item is not in the destination's ownership list. The source item server sends a Start Move request to the destination item server, at step 205.

The destination receives the Start Move request, and executes Add Item (destination accepting transfer), which creates an entry for the item in the destination's ownership list, and sets the item's move status at the destination to destination accepting transfer, at step 210. The destination responds to the Start Move by sending a success response to the source, at step 215. The example API functions have at least two possible return values, success and failure. Success means that the request was completed according to its specifications, and failure means that it may not have completed, but there are no particular assumptions the caller can make about to what extent the request was processed. A failure value is also desirably returned if the request times out. There may be other possible return values also.

The source sends the item's data to the destination, which stores it stably, at step 220. The item might contain a lot of data, so this portion of the process might take a lot of time. Therefore, the source desirably implements this transfer in a way that permits ongoing updates to the item until the destination is almost up-to-date. This may be achieved, for example, by sending a Transfer Preliminary Data request to the destination, and waiting for a success response.

The source locks access to the item at step 225, so clients can no longer update or read it. This is desirably a "soft" lock, and its existence need not be recorded in stable storage. The source finalizes the data transfer by sending any remaining updates to the destination and confirming that the data stored on source and destination are identical, at step 230. This is achieved by sending a Transfer Final Data request to the destination, and waiting for a success response.

The source desirably changes the item's move status at the source from stationary to source attempting transfer by executing a Change Local State for example, at step 235. The source also desirably sends a change state request to the location service to change the item's state at the location service from stable to attempting transfer (e.g., Change State (from: [sourceID, stable]; to: [sourceID, attempting transfer])), at step 240.

At step 245, the location service receives the Change State request, records [sourceID, attempting transfer] in stable storage, and returns success. At step 250, the source receives the successful response from the location service, and sends a Transfer Control request to the destination.

The destination desirably changes the item's move status at the destination from destination accepting transfer to destination attempting transfer (e.g., by executing Change Local State (from: destination accepting transfer, to: destination attempting transfer)), at step 255. The destination also desirably sends a change state request to the location service to change the item's status at the location service from attempting transfer to stable (e.g., Change State (from: [sourceID, attempting transfer]; to: [destID, Stable])), at step 260.

The location service receives the Change State request, records [destID, stable] in stable storage, and returns success, at step 265. Note that this is the point at which the move item process atomically succeeds. If there is a failure at any time before the location service makes this atomic change in its state, the move can be aborted. If there is a failure after this moment, the move will continue and succeed unless prevented by permanent failure of the destination item server.

The destination receives the successful response from the location service, and desirably changes the item's move status at the destination from destination attempting transfer to stationary (e.g., by executing Change Local State (from: destination attempting transfer, to: stationary)), at step 270. The destination sends a success response (in response to the Transfer Control request from the source in step 250) to the source, at step 275.

The source receives the successful response and removes all traces of the item and its data from the source, by executing Delete Item, at step 280. This also removes the item from the source's ownership list.

Figure 3:
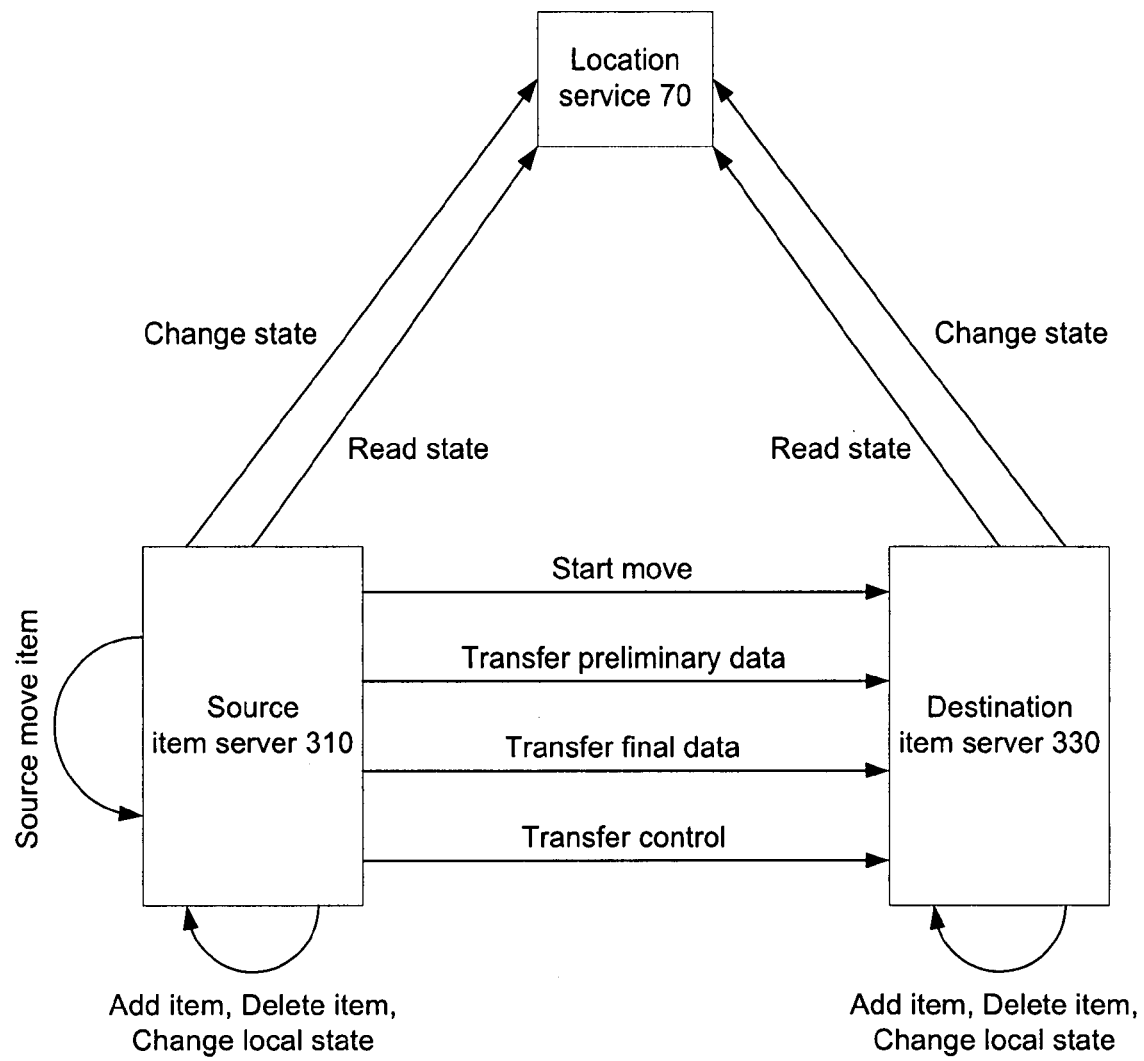
FIG. 3 is a system diagram showing example API functions that may be used in an example move item method.

FIG. 3 is a system diagram showing example API functions that may be used in an example move item method. These example functions are described herein. Although only one source item server 310 and one destination item server 330 are shown, there may be multiple source item servers and multiple destination item servers.

The processes desirably employ an abort action, which consists of running the recovery process as if the item server had rebooted, so any soft state, such as locks and/or data structures, are deleted before running the recovery process.

Figure 4:
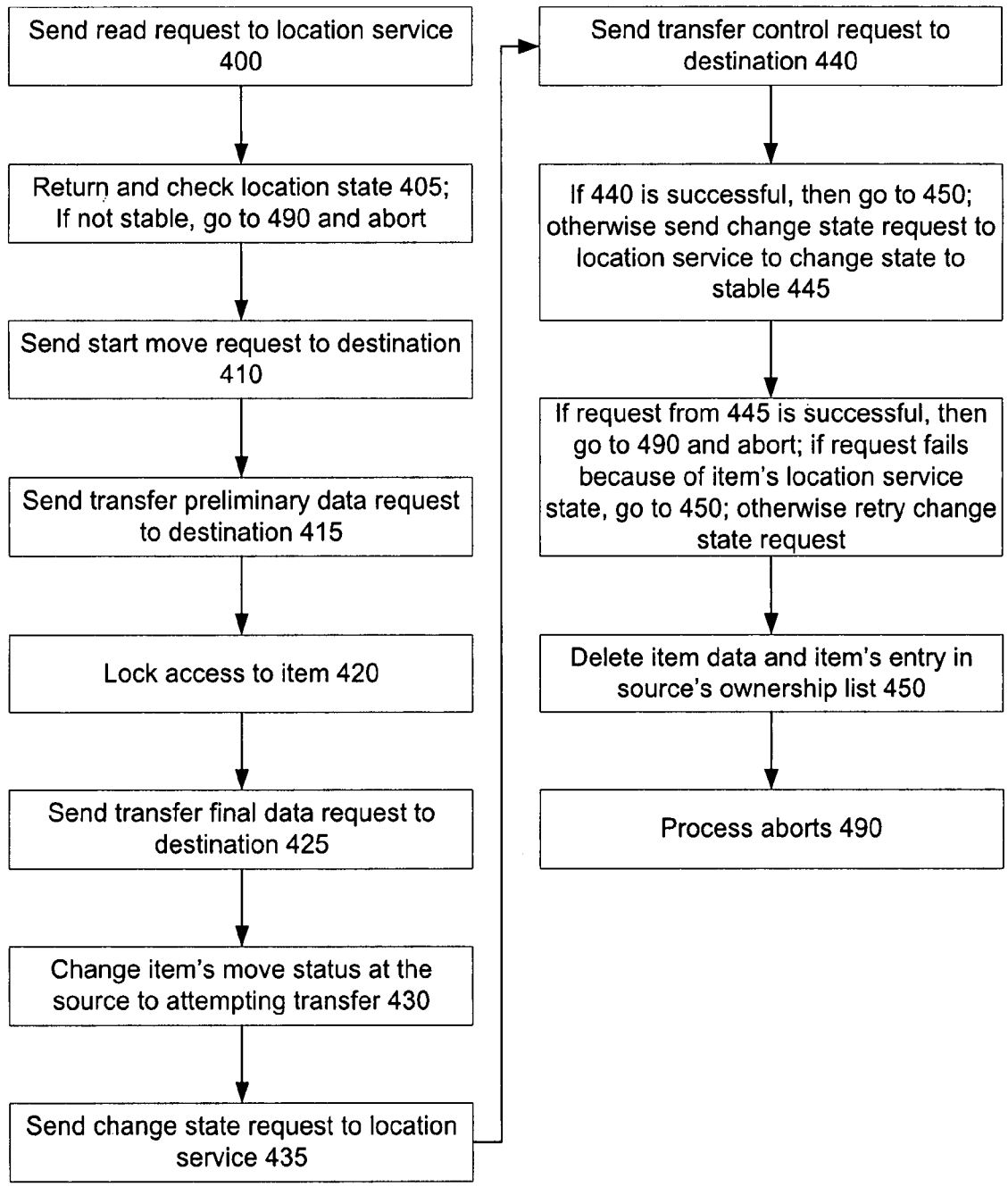
FIG. 4 is a flow diagram of an example source move item method that may be executed on a server.

The process to move an item begins with a "source move item" call on the source item server 310. FIG. 4 is a flow diagram of an example source move item method that may be executed on a source item server. Source move item may be called by some external load-balancing module for example, or possibly the source item server itself would call to execute source move item as specified by some policy regarding its own resource usage metrics.

At step 400, a Read State request is sent to the location service. The returned location service state is returned and checked at step 405. If the returned location service state for the item is not stable for that item (i.e., is not [sourceID, stable]), then the process aborts, at step 490. Otherwise, a Start Move request is sent to the destination, at step 410, with the process aborting on failure and continuing on success. At step 415, a Transfer Preliminary Data request is sent to the destination, with the process aborting on failure and continuing on success.

At step 420, access to the item is locked, so clients can no longer update or read it. This is desirably a "soft" lock-its existence need not be recorded in stable storage. The lock becomes stable, in effect, after step 430 below, since the recovery process reacquires a lock on any item whose local state is not stationary.

At step 425, a Transfer Final Data request is sent to the destination, with the process aborting on failure and continuing on success.

At step 430, the item's move status at the source is changed from stationary to source attempting transfer, e.g., by executing Change Local State (from: stationary, to: source attempting transfer). At step 435, a change state request (e.g., Change State (from: [sourceID, stable]; to: [sourceID, attempting transfer])) is sent to the location service to change the status of the item at the location service from stable to attempting transfer, with the process aborting on failure and continuing on success.

At step 440, a Transfer Control request is sent to the destination. If successful, processing continues at step 450. On failure, however, a Change State (from: [sourceID, attempting transfer]; to: [sourceID, stable]) request is sent to the location service to change the item's status there from attempting transfer to stable, at step 445. If this request succeeds, then the process aborts at step 490. If the request fails because the item's location service state is already changed (e.g., the state is [destID, *]), processing continues at step 450. Otherwise, the change state request is re-tried. At step 450, both the item data and the item's entry in the source's ownership list are deleted (e.g., by executing Delete Item).

Figure 5:
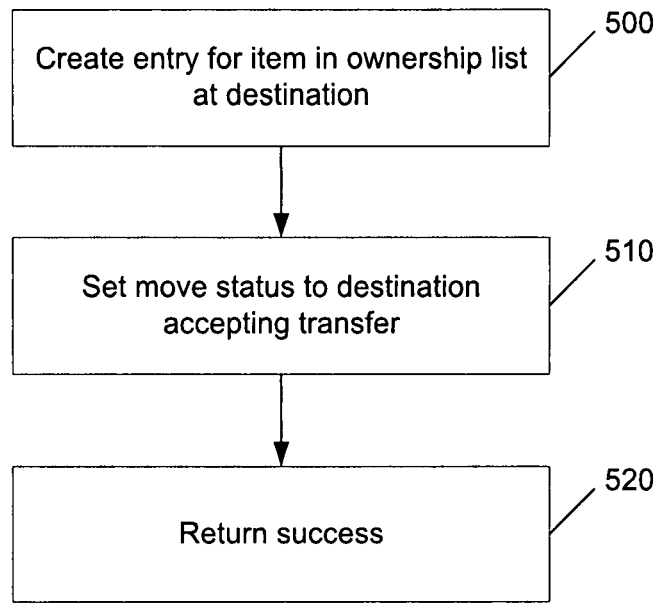
FIG. 5 is a flow diagram of an example start move method.

FIG. 5 is a flow diagram of an example start move method that may be executed on a destination. Add Item (destination accepting transfer) is executed, which creates an entry for the item in the ownership list at step 500, and sets its move status to destination accepting transfer at step 510. Success is returned at step 520.

Figure 6:
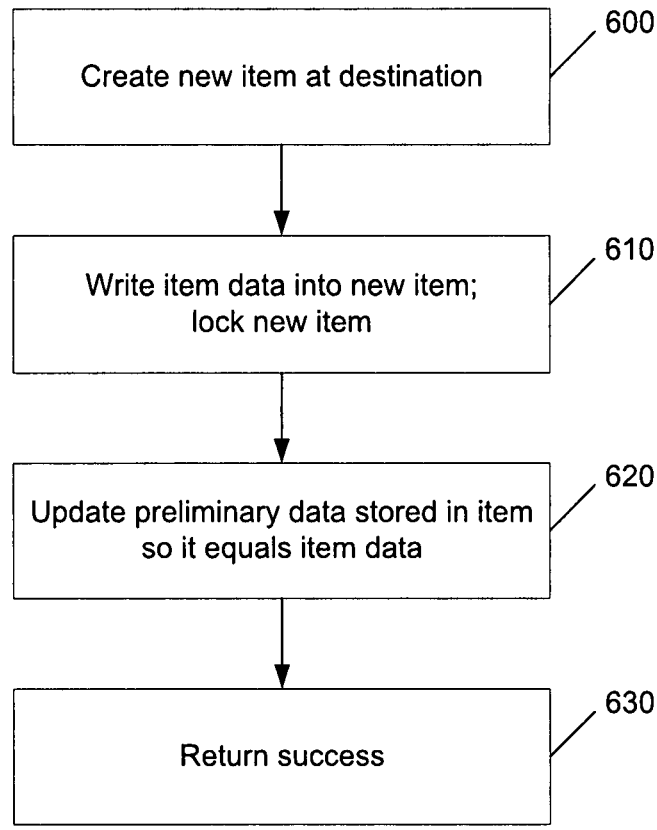
FIG. 6 is a flow diagram of example transfer data methods.

Desirably, after a start move method is executed, the data may be transferred. FIG. 6 is a flow diagram of example transfer data methods that may be executed on a destination. The move status of the item is desirably already set to destination accepting transfer (e.g., from FIG. 5). Transfer Preliminary Data instructs the destination to create a new item at step 600, and write the item data into it at step 610. The new item is desirably locked so that clients may not read or write it.

Transfer Final Data is also executed on a destination. At step 620, the destination updates the preliminary data stored in the item so that it equals the item data. Success is returned at step 630.

Figure 7:
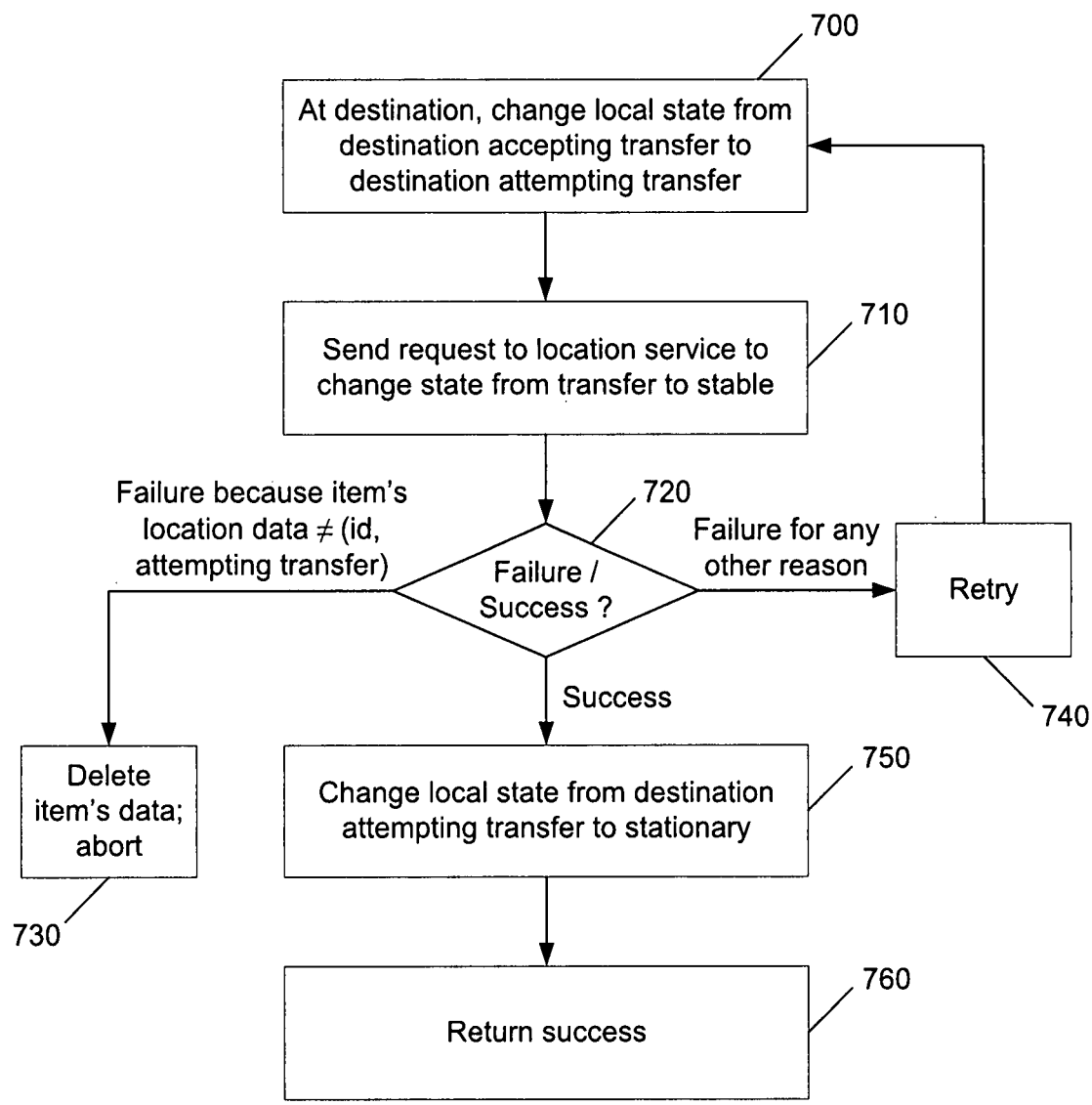
FIG. 7 is a flow diagram of an example transfer control method.

FIG. 7 is a flow diagram of an example transfer control method that is executed on a destination. At step 700, the local state is changed from destination accepting transfer to destination attempting transfer (e.g., Change Local State (from: destination accepting transfer, to: destination attempting transfer)). At step 710, a request is sent to the location service to change the item's state there from attempting transfer to stable (e.g., Change State (from: [sourceID, attempting transfer]; to: [destID, stable])). It is determined at step 720 if the request failed or succeeded. If the request failed because the item's location service data is not equal to [sourceID, attempting transfer], at step 730, the item's data is deleted and the process aborts. If it fails for any other reason, at step 740, retry is performed. If it succeeds, processing continues at step 750.

At step 750, the local state is changed from destination attempting transfer to stationary (e.g., Change Local State (from: destination attempting transfer, to: stationary)), and success is returned at step 760.

Regarding recovery algorithms, if an item server reboots while it is involved as the source or destination of a move item process, it desirably performs some recovery actions. Specifically, suppose that on reboot, an item server determines that the move status of an item is not equal to stationary. The item server desirably begins recovery by querying the location service to determine the item's location service information. The item server then desirably performs one of the following recovery processes, depending on the item's move status and location service info.

If source attempting transfer state is at the source, and the state at the location service for the item is that the item is at the source and stable (e.g., Source Attempting Transfer, [sourceID, stable]), processing continues at step 435, as described above. If source attempting transfer state is at the source and the state at the location service is attempting transfer (e.g., Source Attempting Transfer, [sourceID, attempting transfer]), processing continues at step 440, as described above. If source attempting transfer state is at the source, and the state at the location service for the item is that the item is at the destination and stable (e.g., Source Attempting Transfer, [destID, stable]), processing continues at step 450, as described above.

If destination attempting transfer state is at the destination, and the state at the location service for the item is that the item is at the source and stable (e.g., Destination Accepting Transfer, [sourceID, stable]), there are two possible exemplary actions. Either do nothing (and wait for the source to continue transferring data and/or issue a Transfer Control request), or abort the move by executing Delete Item, which deletes all item data including the item's entry in the ownership list.

The first alternative (do nothing) has an advantage that the source can continue the move that was interrupted by a reboot. But it has a disadvantage that if the source has encountered a problem or timeout and has aborted the move, the destination will not free up the disk space used by the item's transferred data (at least until one of the garbage collection sweeps described below, for example). The second alternative has an advantage of releasing this disk space in a timely fashion, but means that a move item cannot continue across a reboot at this point.

If destination accepting transfer state is at the destination, and the state at the location service for the item is that the item is at the source and attempting transfer (e.g., Destination Accepting Transfer, [sourceID, attempting transfer]), processing continues at step 700, as described above.

If destination attempting transfer state is at the destination, and the state at the location service for the item is that the item is at the source and attempting transfer (e.g., Destination Attempting Transfer, [sourceID, attempting transfer]), processing continues at step 710, as described above.

If destination attempting transfer state is at the destination, and the state at the location service for the item is that the item is at the destination and stable (e.g., Destination Attempting Transfer, [destID, stable]), processing continues at step 750, as described above.

Figure 8:
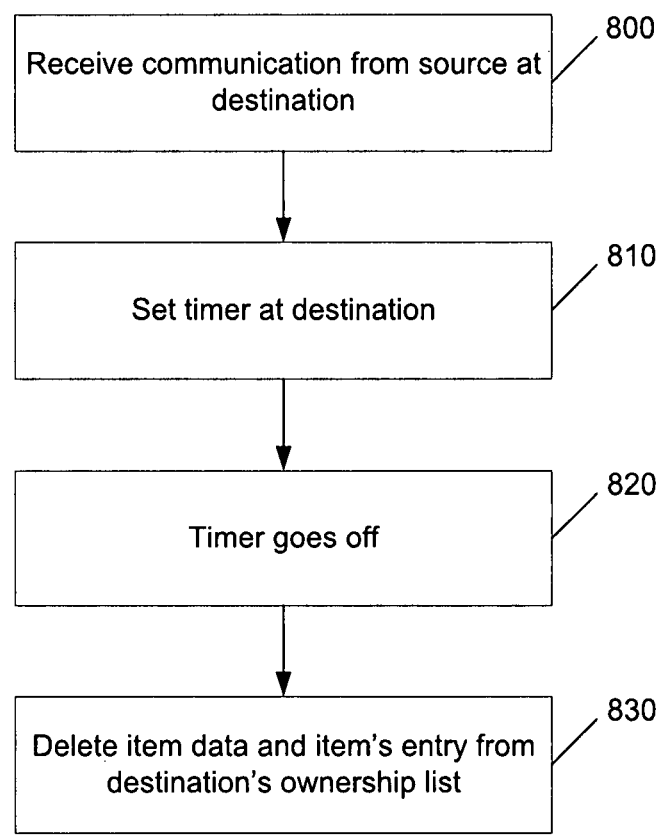
FIG. 8 is a flow diagram of an example garbage collection method.

FIG. 8 is a flow diagram of an example garbage collection method that may be executed on the destination. If the source aborts a move item, the destination may be left with a large amount of orphaned item data. Therefore, after every communication from the source at step 800, the destination desirably sets a timer at step 810 whose duration is the maximum reasonable time before the source should communicate with the destination again. If the timer goes off, at step 820, the destination aborts its move by deleting the item data and the item's entry in the destination's ownership list at step 830.

The above example descriptions are from the source's point of view, but it is contemplated that the initiation of the move could be from the destination and such processing is substantially equivalent.

Figure 9:
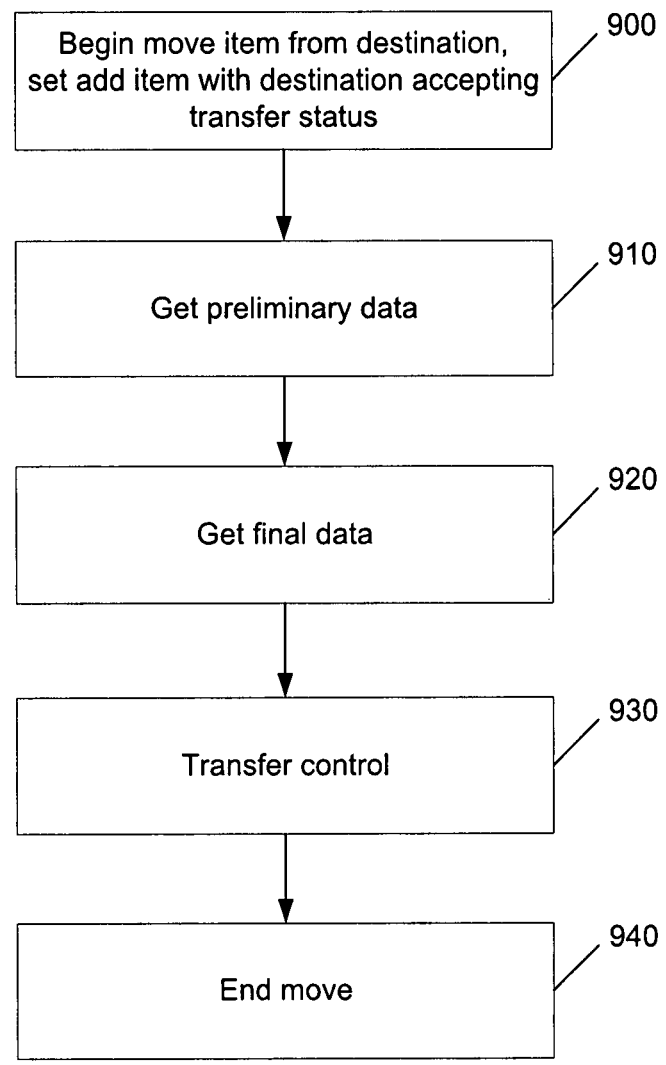
FIG. 9 is a flow diagram of another example move method that may be initiated by a server.

More particularly, the destination item server can run a top-level move process, described with respect to FIG. 9, instead of the source. In this example, the top-level process may be referred to as Destination Move Item. Transfer Preliminary Data, Transfer Final Data, and Transfer Control may be replaced with some API functions that are called by the destination and sent as requests to the source, e.g., Give Me Preliminary Data, Give Me Final Data, and End Move.

Destination Move Item begins at step 900 with an Add Item (destination accepting transfer) which creates an entry for the item in the destination's ownership list, and sets the item's move status at the destination to destination accepting transfer.

Give Me Preliminary Data is called at step 910. To implement Give Me Preliminary Data, the source desirably sends the current item data to the destination and returns success.

At step 920, Give Me Final Data is called, and then the first several steps of Transfer Control are executed (e.g., steps 700-750), at step 930. To implement Give Me Final Data, the source desirably first sends final differences between what it has stored for the item data and what the destination has received for the item data, then performs steps 420-435 of Source Move Item before sending a success response.

An End Move request is sent to the source at step 940 (e.g., before step 750). To implement End Move, the source may execute Delete Item and send a success response.

The recovery algorithms for this alternative approach are similar to the recovery described above, so the details are omitted here for brevity.

Exemplary Computing Arrangement

Figure 10:
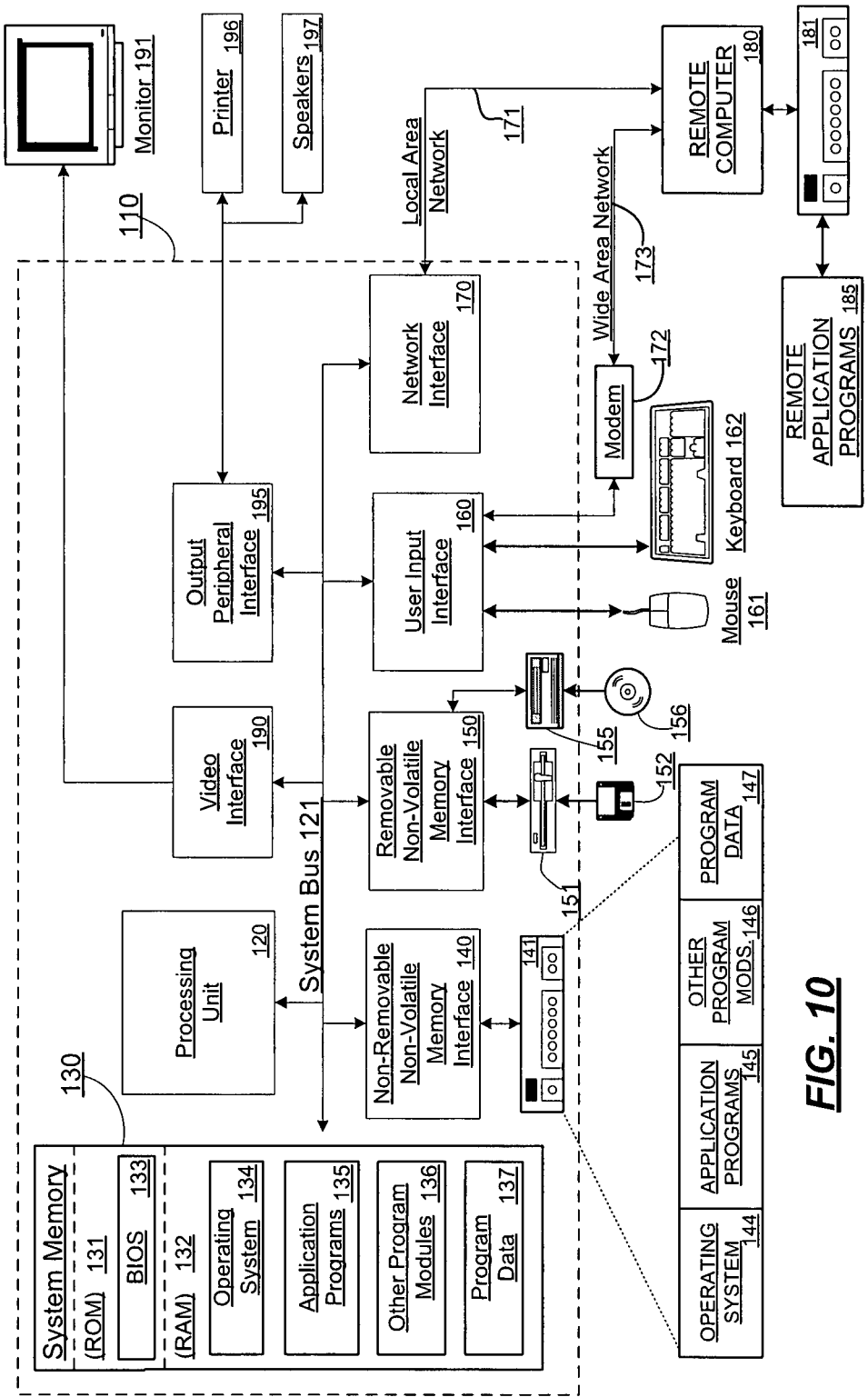
FIG. 10 is a block diagram of an example computing environment in which example embodiments and aspects may be implemented.

FIG. 10 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method comprising:
    sending a move request from a source server to a destination server, the move request requesting to move an item having item data from the source server to the destination server;
    receiving a success response from the destination server in response to the move request, the success response indicating that the destination server has created an entry for the item in an ownership list associated with the destination server;
    transferring the item data from the source server to the destination server, wherein transferring the item data from the source server to the destination server comprises:
        transferring preliminary data associated with the item from the source server to the destination server, the preliminary data instructing the destination server to create a new item for the item data to be transferred,
        locking access to the item at the source server so that clients cannot update or read the item, and
        transferring final data associated with the item from the source server to the destination server;
    changing a move status of the item at the source server from stationary to source attempting transfer;
    sending a change state request to a location service requesting the location service to change a state of the item from stable to attempting transfer;
    transferring control to the destination server, wherein the control is transferred to the destination server in an instance when another change state request sent by the destination server to the location service is successful in changing the state of the item from attempting transfer to stable; and
    deleting the item at the source server.

2. The method of claim 1, further comprising:
    sending a read state request to the location service prior to sending the move request to the destination server; and
    in an instance when the location service responds to the read state request by indicating that the state of the item is other than stable, then aborting the method.

3. The method of claim 2, further comprising:
    sending the change state request to the location service prior to transferring control to the destination server.

4. The method of claim 1, wherein deleting the item at the source server comprises deleting an item entry in an ownership list associated with the source server.

5. The method of claim 1, wherein the locking is performed with a soft lock that is not recorded in stable storage of the source server.

6. The method of claim 1, wherein transferring the item data comprises confirming, by the source server, that the item data is identical at the source server and the destination server.

7. At least one computer-readable memory device or storage device storing computer readable instructions which, when executed by at least one processing unit, cause the at least one processing unit to perform acts comprising:
    sending a move request from a source server to a destination server, the move request requesting to move an item having item data from the source server to the destination server;
    receiving a success response from the destination server in response to the move request, the success response indicating that the destination server has created an entry for the item in an ownership list associated with the destination server;
    transferring the item data from the source server to the destination server, wherein transferring the item data from the source server to the destination server comprises:
        transferring preliminary data associated with the item from the source server to the destination server,
        locking access to the item at the source server so that clients cannot update or read the item, and
        transferring final data associated with the item from the source server to the destination server;
    changing a move status of the item at the source server from a first status indicating the item is stationary to a second status indicating the source server is attempting to transfer the item;
    sending a change state request to a location service requesting the location service to change a state of the item from a first state indicating the item is stable to a second state indicating there is an attempted transfer of the item;
    receiving another success response from the location service, the another success response indicating that the location service changed the state of the item to the second state;
    sending a transfer control request to the destination server responsive to receiving the another success response from the location service; and
    deleting the item at the source server.

8. The at least one computer-readable memory device or storage device of claim 7, the acts further comprising:
    receiving, from the destination server, a further success response to the transfer control request,
    wherein the deleting is performed responsive to receiving the further success response.

9. The at least one computer-readable memory device or storage device of claim 7, wherein the locking is performed after transferring the preliminary data.

10. The at least one computer-readable memory device or storage device of claim 9, wherein the locking is performed before transferring the final data.

11. The at least one computer-readable memory device or storage device of claim 7, the acts further comprising:
    receiving ongoing updates from the clients and updating the item data based on the ongoing updates,
    wherein the ongoing updates are provided to the destination server with the preliminary data.

12. The at least one computer-readable memory device or storage device of claim 7, the acts further comprising:
    sending another transfer control request to the destination server for another data item; and
    upon failure of the another transfer control request, sending another change state request to the location service to change the state of the another data item to the first state.

13. The at least one computer-readable memory device or storage device of claim 12, the acts further comprising:
    deleting the another data item from the source server in an instance when the another change state request fails because the location service has associated the another data item with the destination server.

14. A computing device comprising:
    one or more processing units; and
    at least one computer-readable memory device or storage device storing computer readable instructions that, when executed by the one or more processing units, cause the one or more processing units to:
        send a move request from the computing device to another computing device, the move request requesting to move an item having item data from the computing device to the another computing device;
        receive a success response from the another computing device in response to the move request, the success response indicating that the another computing device has received the move request;
        transfer the item data from the computing device to the another computing device, wherein, to transfer the item data from the computing device to the another computing device, the computer readable instructions further cause the one or more processing units to:
            transfer preliminary data associated with the item from the computing device to the another computing device,
            lock access to the item at the computing device, and
            transfer final data associated with the item from the computing device to the another computing device;
        change a move status of the item at the computing device from a first status indicating the item is stationary to a second status indicating the computing device is attempting to transfer the item;
        send a change state request to a location service requesting the location service to change a state of the item from a first state indicating the item is stable to a second state indicating there is an attempted transfer of the item;
        receive another success response from the location service, the another success response indicating that the location service changed the state of the item to the second state;
        send a transfer control request to the another computing device responsive to receiving the another success response from the location service; and
        delete the item at the computing device.

15. The computing device of claim 14, wherein the computer readable instructions further cause the one or more processing units to:
    send a read state request to the location service prior to sending the move request to the another computing device; and
    in an instance when the location service responds to the read state request by indicating that the state of the item is not the first state, abort transfer of the item.

16. The computing device of claim 15, wherein the computer readable instructions further cause the one or more processing units to:

receive, from the another computing device, a further success response to the transfer control request,
wherein the item is deleted responsive to receipt of the further success response.

17. The computing device of claim 15, the at least one computer-readable memory device or storage device comprising one or more soft storage devices and one or more stable storage devices, wherein the computer readable instructions further cause the one or more processing units to:
lock access to the item via a lock stored in the one or more soft storage devices without also storing the lock in the one or more stable storage devices.

18. The computing device of claim 17, wherein the lock prevents other computing devices from updating the item.

19. The computing device of claim 15, wherein the item comprises a file.

* * * * *